United States Patent
Yu et al.

(10) Patent No.: US 9,559,758 B2
(45) Date of Patent: *Jan. 31, 2017

(54) TRANSMISSION/RECEPTION APPARATUS AND METHOD FOR SUPPORTING MIMO TECHNOLOGY IN A FORWARD LINK OF A HIGH RATE PACKET DATA SYSTEM

(71) Applicant: Samsung Electronics Co., Ltd., Gyeonggi-do (KR)

(72) Inventors: Jae-Chon Yu, Gyeonggi-do (KR); Hwan-Joon Kwon, Gyeonggi-do (KR); Dong-Hee Kim, Gyeonggi-do (KR); Yu-Chul Kim, Gyeonggi-do (KR); Jin-Kyu Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 13 days.

This patent is subject to a terminal disclaimer.

(21) Appl. No.: 14/325,987

(22) Filed: Jul. 8, 2014

(65) Prior Publication Data

US 2014/0321567 A1    Oct. 30, 2014

Related U.S. Application Data

(63) Continuation of application No. 13/685,333, filed on Nov. 26, 2012, now Pat. No. 8,774,137, which is a
(Continued)

(30) Foreign Application Priority Data

Jan. 25, 2006  (KR) ........................ 10-2006-0007981

(51) Int. Cl.
*H04B 7/04*     (2006.01)
*H04L 5/02*     (2006.01)
(Continued)

(52) U.S. Cl.
CPC ........... *H04B 7/0417* (2013.01); *H04L 5/0023* (2013.01); *H04L 5/0048* (2013.01);
(Continued)

(58) Field of Classification Search
None
See application file for complete search history.

(56) References Cited

U.S. PATENT DOCUMENTS 8,355,313 B2    1/2013  Walton et al.
2002/0041635 A1    4/2002  Ma et al.
(Continued)

FOREIGN PATENT DOCUMENTS

CN    1486546    3/2004
CN    1531787    9/2004
(Continued)

OTHER PUBLICATIONS

Taeyoung Kim et al., "Performance Enhancement of 1x EV/DV MIMO Systems in Frequency Selective Fading Channels", Globecom 2003, Dec. 5, 2003, 6 pages.
(Continued)

*Primary Examiner* — Robert C Scheibel
(74) *Attorney, Agent, or Firm* — The Farrell Law Firm, P.C.

(57) ABSTRACT

Methods and apparatus are provided for transmitting and receiving data in a communication system with a plurality of antennas. A method includes informing information related to a transmission time interval for transmission based on a second type reference signal; and transmitting data based on the second type reference signal in the transmission time interval defined by the information related to the transmission time interval for transmission based on the second type reference signal. The transmission time interval defined by the information related to the transmission time interval for
(Continued)

transmission based on the second type reference signal is located on a fixed position within a period including a plurality of transmission time intervals.

18 Claims, 12 Drawing Sheets

Related U.S. Application Data continuation of application No. 13/153,892, filed on Jun. 6, 2011, now Pat. No. 8,320,338, and a continuation of application No. 11/698,294, filed on Jan. 25, 2007, now Pat. No. 7,957,483.

(51) Int. Cl.
| | | |
|---|---|---|
| H04L 5/00 | (2006.01) | |
| H04L 25/02 | (2006.01) | |
| H04L 27/00 | (2006.01) | |
| H04L 27/26 | (2006.01) | |
| H04L 25/03 | (2006.01) | |

(52) U.S. Cl.
CPC ...... *H04L 25/0204* (2013.01); *H04L 27/0008* (2013.01); *H04L 27/0012* (2013.01); *H04L 27/2626* (2013.01); *H04L 5/0026* (2013.01); *H04L 25/0228* (2013.01); *H04L 2025/03414* (2013.01); *H04L 2025/03426* (2013.01)

(56) References Cited

U.S. PATENT DOCUMENTS

| | | |
|---|---|---|
| 2003/0002450 A1 | 1/2003 | Jalali et al. |
| 2003/0153273 A1 | 8/2003 | Ebert et al. |
| 2003/0235147 A1 | 12/2003 | Walton et al. |
| 2004/0001429 A1 | 1/2004 | Ma et al. |
| 2004/0082356 A1* | 4/2004 | Walton ............... H04B 7/022 455/522 |
| 2004/0120411 A1* | 6/2004 | Walton ............... H04B 7/0417 375/260 |
| 2004/0132494 A1 | 7/2004 | Tirkkonen et al. |
| 2004/0136349 A1* | 7/2004 | Walton ............... H04B 7/0417 370/338 |
| 2004/0165676 A1 | 8/2004 | Krishnan et al. |
| 2004/0179627 A1* | 9/2004 | Ketchum ............. H04B 7/0421 375/267 |
| 2004/0196800 A1 | 10/2004 | Padovani et al. |
| 2004/0202142 A1 | 10/2004 | Batariere et al. |
| 2004/0240401 A1 | 12/2004 | Willenegger et al. |
| 2004/0248618 A1 | 12/2004 | Yoshii et al. |
| 2005/0002468 A1 | 1/2005 | Walton et al. |
| 2005/0063345 A1* | 3/2005 | Wu .................. H04B 1/707 370/335 |
| 2005/0111376 A1 | 5/2005 | Raghothaman et al. |
| 2005/0120097 A1* | 6/2005 | Walton ............... H04L 1/0002 709/220 |
| 2005/0249177 A1 | 11/2005 | Huo et al. |
| 2005/0254589 A1 | 11/2005 | Higuchi et al. |
| 2005/0270969 A1 | 12/2005 | Han et al. |
| 2005/0276238 A1 | 12/2005 | Dabak et al. |
| 2006/0018287 A1* | 1/2006 | Walton ............... H04B 7/0413 370/334 |
| 2006/0256761 A1* | 11/2006 | Meylan ............... H04B 7/0417 370/338 |
| 2007/0041457 A1 | 2/2007 | Kadous et al. |
| 2007/0070928 A1* | 3/2007 | Sutivong ............. H04B 7/0417 370/310 |
| 2007/0082692 A1 | 4/2007 | Tirkkonen et al. |
| 2007/0087749 A1* | 4/2007 | Ionescu ................ H04B 7/04 455/436 |
| 2007/0217546 A1 | 9/2007 | Sandell et al. |
| 2008/0151743 A1* | 6/2008 | Tong .................... H04B 1/707 370/204 |
| 2009/0129334 A1* | 5/2009 | Ma ....................... H04B 7/022 370/331 |
| 2009/0234443 A1 | 9/2009 | Ottma et al. |
| 2011/0018290 A1 | 1/2011 | Jones |

FOREIGN PATENT DOCUMENTS

| | | |
|---|---|---|
| CN | 1539230 | 10/2004 |
| CN | 1579063 | 2/2005 |
| CN | 1663213 | 8/2005 |
| CN | 1688143 | 10/2005 |
| CN | 1697429 | 11/2005 |
| CN | 101305529 | 11/2008 |
| JP | 2004-023716 | 1/2004 |
| JP | 2004-120730 | 4/2004 |
| JP | 2004-336670 | 11/2004 |
| JP | 2005-057870 | 3/2005 |
| JP | 2005-531219 | 10/2005 |
| JP | 2005-323382 | 11/2005 |
| JP | 2008-528069 | 7/2008 |
| JP | 2009528069 | 8/2009 |
| KR | 1020050053787 | 6/2005 |
| KR | 1020050103099 | 10/2005 |
| WO | WO 2005/057870 | 6/2005 |
| WO | WO 2005-104397 | 11/2005 |
| WO | WO 2006/002074 | 1/2006 |
| WO | WO 2007/024853 | 3/2007 |

OTHER PUBLICATIONS

W. Xiao et al., "1xEV-DO System Performance: Analysis and Simulation," 2004 IEEE 60th Vehicular Technology Conference, VTC2004-Fall 2004, vol. 7, Sep. 29, 2004, 6 pages.

Duc V. Duong et al., "Optimal Pilot Spacing and Power in Rate-Adaptive MIMO Diversity Systems with Imperfect Transmitter CSI", 2005 IEEE 6th Workshop on.

Signal Processing Advances in Wireless Communications, Jun. 8, 2005, 6 pages.

Japanese Office Action dated Jul. 13, 2015 issued in counterpart application No. 2014-143010, 10 pages.

Chinese Office Action dated Jun. 24, 2016 issued in counterpart application No. 201210074691.0, 10 pages.

* cited by examiner

TRANSMISSION/RECEPTION APPARATUS AND METHOD FOR SUPPORTING MIMO TECHNOLOGY IN A FORWARD LINK OF A HIGH RATE PACKET DATA SYSTEM

PRIORITY

This application is a Continuation Application of U.S. Pat. No. 8,774,137, which issued on Jul. 8, 2014, which is a Continuation Application of U.S. Pat. No. 8,320,338, which issued on Nov. 27, 2012, which is a Continuation Application of U.S. Pat. No. 7,957,483, which issued on Jun. 7, 2011, and claims priority 35 U.S.C. §119(a) to an application filed in the Korean Industrial Property Office on Jan. 25, 2006 and assigned Serial No. 10-2006-0007981, the content of each of which is incorporated herein by reference.

BACKGROUND OF THE INVENTION

1. Field of the Invention

The present invention generally relates to an apparatus and a method for transmitting/receiving data in a High Rate Packet Data (HRPD) system, and more particularly to a transmission/reception apparatus and method for supporting an Orthogonal Frequency Division Multiplexing (OFDM) scheme and a Multiple Input Multiple Output (MIMO) technology as well as an Evolution Data Only (EV-DO) transmission scheme in an HRPD system.

2. Description of the Related Art

With rapid development of communication technology, current mobile communication systems are providing not only ordinary voice communication services but also high rate data services which enable transmission of large-capacity digital data, such as moving images, as well as transmission of an e-mail or a still image, by using a Mobile Station (MS).

Representative examples of mobile communication systems currently providing high rate data services include an EV-DO system, an OFDM system, etc. An EV-DO system uses one of the high rate data service standards proposed by the Qualcomm company of the United States for transmission of large-capacity digital data and has been one-step evolved from a conventional Code Division Multiple Access (CDMA) 2000 1x in order to provide a forward transmission speed of 2.4 Mbps. An EV-DO system is also called an "HRPD system."

Further, one of representative wireless communication systems employing a multi-carrier transmission scheme is an OFDM system. According to an OFDM scheme, a serial symbol sequence is converted into parallel symbol sequences and the parallel symbol sequences are modulated with a plurality of mutually orthogonal sub-carriers before being transmitted. OFDM schemes have come into the spotlight since the beginning of the 1990's according to development of Very Large Scale Integration (VLSI) technology.

According to an OFDM transmission scheme, data is modulated with multiple sub-carriers, and the sub-carriers maintain orthogonality between them. Therefore, an OFDM transmission scheme is stronger against a frequency selective multi-path fading channel and is more proper for HRPD services, such as a broadcasting service, than a conventional single carrier modulation scheme.

A slot structure and a transmitter structure in a forward link of a typical HRPD system will now be briefly described.

A forward link of an HRPD system uses a Time Division Multiple Access (TDMA) technology for multiple access, and uses a Time Division Multiplexing (TDM)/Code Division Multiplexing (CDM) scheme for multiplexing.

FIG. 1 shows a slot structure of a forward link in a conventional HRPD system. One slot has a structure including repeated one-half slots. Each of the one-half slots includes a pilot signal 103 or 108 having an $N_{pilot}$ chip length, which is inserted at a center thereof and is used in channel estimation of the forward link in a receiver of an MS. Medium Access Control (MAC) signals 102, 104, 107, and 109, each of which has an $N_{MAC}$ chip length and includes reverse power control information and resource allocation information, are located at both sides of associated pilot signals 103 and 108. Further, actual transmission data 101, 105, 106, and 110, each of which has an $N_{Data}$ chip length, are located at opposite outer sides of associated MAC signals 102, 104, 107, and 109. In an HRPD system as described above, a slot of a forward link has been multiplexed according to a TDM scheme in which a pilot, MAC information, data, etc. are transmitted at different time points. In the slot structure shown in FIG. 1, the MAC information and the data are multiplexed according to a CDM scheme using Walsh codes, and the pilot signal, the MAC signal, and a small block unit of data have been set to have sizes such that $N_{pilot}$=96 chips, $N_{MAC}$=64 chips, and $N_{Data}$=400 chips, respectively, in the forward link of the HRPD system.

FIG. 2 shows a transmitter of a conventional HRPD system. Packet data of a data channel passes through a channel encoder 201 for channel-encoding the packet data, a channel interleaver 202 for interleaving the encoded data, and a modulator 203 for modulating the interleaved packet data. Data of a MAC channel passes through a channel encoder 204. The pilot tone, the MAC signal, and the data pass through a TDM multiplexer (MUX) 206 and then form a physical link having a slot structure of FIG. 1. The data output from the TDM MUX 206 is transmitted to users through an antenna (not shown) after passing through a sub-carrier modulator 207. Reference numeral 208 in FIG. 2 denotes an HRPD processor for compatibility with an HRPD system, which includes the channel encoder 204, the TDM MUX 206, and the sub-carrier modulator 207.

However, an HRPD system having the above-described structure is insufficient for adequate support of wideband data transmission and efficient use of frequency resources, which are used by next generation systems, such as broadcasting service systems. In order to support wideband data transmission and efficient use of frequency resources, a need exists to provide a solution for high speed data transmission and efficient use of frequency resources by using multiple antennas and a proper data modulation scheme.

SUMMARY OF THE INVENTION

Accordingly, the present invention has been made to solve the above-mentioned problems occurring in the prior art, and an object of the present invention is to provide a transmission/reception apparatus and method for supporting an OFDM scheme and a MIMO technology as well as an EV-DO transmission scheme in an HRPD system.

It is another object of the present invention to provide a transmission/reception apparatus and method for supporting an OFDM scheme and an EV-DO transmission scheme and supporting the MIMO technology by allocating a position of a data symbol to a fixed interlace in an HRPD system.

In accordance with one aspect of the present invention, a method is provided for transmitting data in a communication system with a plurality of antennas. The method includes informing information related to a transmission time interval for transmission based on a second type reference signal; and transmitting data based on the second type reference signal in the transmission time interval defined by the information related to the transmission time interval for transmission based on the second type reference signal. The transmission time interval defined by the information related to the transmission time interval for transmission based on the second type reference signal is located on a fixed position within a period including a plurality of transmission time intervals.

In accordance with another aspect of the present invention, a transmitter is provided for transmitting data in a communication system with a plurality of antennas. The transmitter includes a transmission unit configured to inform information related to a transmission time interval for transmission based on a second type reference signal and to transmit data based on the second type reference signal in the transmission time interval defined by the information related to the transmission time interval for transmission based on the second type reference signal. The transmission time interval defined by the information related to the transmission time interval for transmission based on the second type reference signal is located on a fixed position within a period including a plurality of transmission time intervals.

In accordance with another aspect of the present invention, a method is provided for receiving data in a communication system with a plurality of antennas. The method includes receiving information related to a transmission time interval for transmission based on a second type reference signal; and receiving data based on the second type reference signal in the transmission time interval defined by the information related to the transmission time interval for transmission based on the second type reference signal. The transmission time interval defined by the information related to the transmission time interval for transmission based on the second type reference signal is located on a fixed position within a period including a plurality of transmission time intervals.

In accordance with one aspect of the present invention, a receiver is provided for receiving data in a communication system with a plurality of antennas. The receiver includes a receiving unit configured to receive information related to a transmission time interval for transmission based on a second type reference signal and to receive data based on the second type reference signal in the transmission time interval defined by the information related to the transmission time interval for transmission based on the second type reference signal. The transmission time interval defined by the information related to the transmission time interval for transmission based on the second type reference signal is located on a fixed position within a period including a plurality of transmission time intervals.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Hereinafter, various embodiments of the present invention will be described with reference to the accompanying drawings. In the following description, a detailed description of known functions and configurations will be omitted when it may make the subject matter of the present invention rather unclear.

Figure 3:
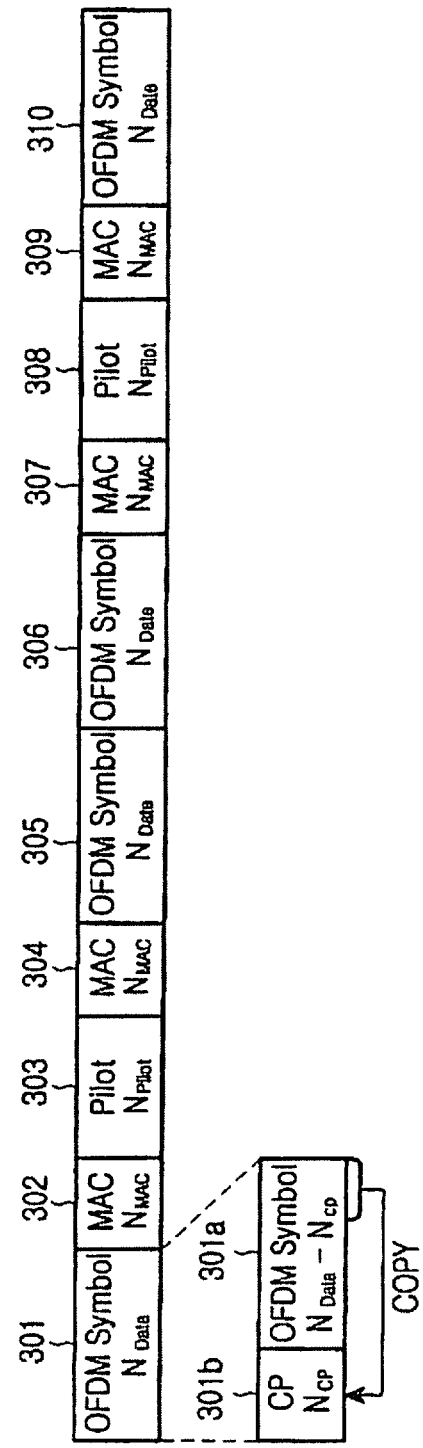
FIG. 3 illustrates a slot structure of a forward link in an HRPD system according to the present invention, in which OFDM symbols are inserted in data transmission periods.

FIG. 3 shows a slot structure of a forward link in a High Rate Packet Data (HRPD) system according to the present invention, in which Orthogonal Frequency Division Multiplexing (OFDM) symbols are inserted in data transmission periods.

Figure 1:
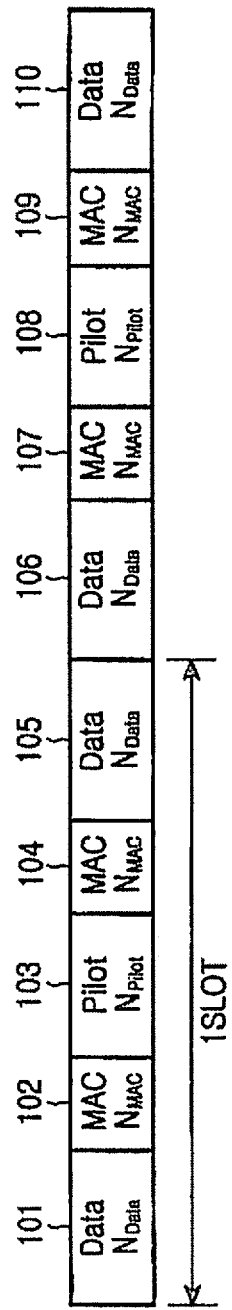
FIG. 1 illustrates a slot structure of a forward link in a conventional HRPD system.

In an HRPD system according to the present invention, locations and sizes of a pilot signal and a Medium Access Control (MAC) signal for maintaining compatibility with a forward link are the same as those in the slot structure of the conventional forward link shown in FIG. 1. Therefore, a pilot signal 303 or 308 having an $N_{pilot}$ chip length is located at a center of each one-half slot, and MAC signals 302, 304, 307, and 309 each having an $N_{MAC}$ chip length are located at both sides of associated pilot signals 303 and 308. Therefore, even a typical HRPD Mobile Station (MS), which does not support an OFDM transmission scheme, can perform channel estimation through the pilot signals 303 and 308 and can receive the MAC signals 302, 304, 307, and

309. In the remaining regions, that is, in the data transmission periods, OFDM symbols 301, 305, 306, and 310 are inserted.

In the forward link of an ordinary HRPD system, a data transmission period is set to have a size so $N_{Data}$=400 chips. According to an OFDM transmission scheme, a Cyclic Prefix (CP) is attached to the front of an OFDM symbol to be transmitted, in order to prevent self-interference of a time-delayed incoming signal through a multi-path. That is, one OFDM symbol includes a CP 301*b* and OFDM data 301*a* obtained through Inverse Fast Fourier Transform (IFFT) of packet data information.

The CP 301*b* has a size of $N_{CP}$ chips and is obtained by copying a signal as much as the $N_{CP}$ chips from the rear portion of the OFDM data and the attaching the copied signal to the front of the OFDM data. Therefore, the OFDM data has a size of ($N_{Data}$-$N_{CP}$), wherein $N_{CP}$ is determined according to how much the time delay causing self-interference will be allowed. When $N_{CP}$ is large, more delayed incoming signals can be demodulated without causing interference. However, the size of the OFDM data is reduced just as much, thus the quantity of information to be transmitted is also reduced. In contrast, when $N_{CP}$ is small, the information to be transmitted can be increased. However, the probability of occurrence of self-interference in an environment having a severe multi-path fading increases, thereby degrading the reception quality.

All of $N_{Data}$ number of tones cannot be used in the data symbol transmission. Some tones located in the periphery of a used frequency band should be used as guard tones in order to reduce the influence by the interference of signals out of the used frequency band. The pilot signals 303 and 308 used in the forward link of the conventional HRPD system are also used for the channel estimation of the OFDM symbol. However, dedicated signals are additionally necessary for the channel estimation of a multi-antenna system for Multiple Input Multiple Output (MIMO) users. To this end, some tones may be used in order to transmit signals for use in channel estimation. As used herein, such tones will be called "MIMO pilot tones."

Figure 4:
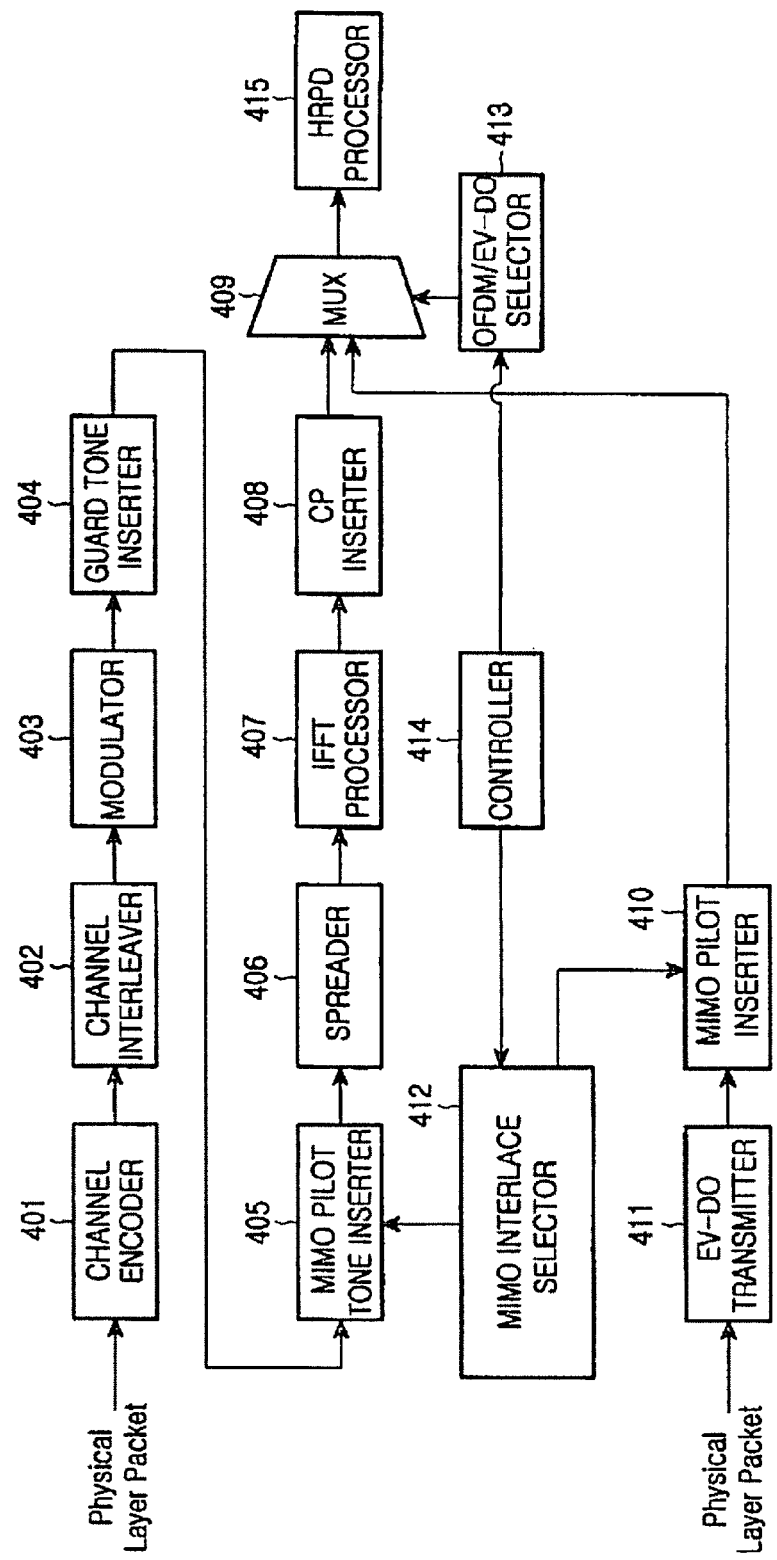
FIG. 4 illustrates a structure of a transmitter in an HRPD system according to the present invention.

FIG. 4 shows a transmitter in an HRPD system according to the present invention. The transmitter includes a channel encoder 401 for channel-encoding packet data, a channel interleaver 402 for interleaving the encoded packet data, a modulator 403 for modulating the interleaved packet data, a guard tone inserter 404 for inserting guard tones in order to reduce the influence of interference by the signals out of the band, and a MIMO pilot tone inserter 405 for inserting MIMO pilot tones for channel estimation of a multi-antenna in a receiver mobile station of a MIMO user.

The transmitter shown in FIG. 4 also includes a spreader 406, an IFFT processor 407 for converting a time-domain signal into a frequency-domain signal, a CP inserter 408 for inserting a CP into a front part of OFDM data, an HRPD processor 415 for compatibility with a transmission scheme of the HRPD system, an EV-DO transmitter 411, and a MIMO pilot inserter 410 for inserting a MIMO pilot for an HRPD system. The spreader 406 may be, for example, a Quadrature Phase Shift Keying (QPSK) spreader.

The transmitter shown in FIG. 4 also includes a MIMO interlace selector 412 and an OFDM/EV-DO selector 413. The MIMO interlace selector 412 selects and operates the MIMO pilot tone inserter 405 in order to transmit a MIMO pilot tone by a dedicated pilot when an OFDM transmission scheme supporting the MIMO is used, and selects and operates the MIMO pilot inserter 410 in order to transmit a MIMO pilot by a dedicated pilot when an Evolution Data Only (EV-DO) transmission scheme supporting the MIMO is used. The OFDM/EV-DO selector 413 controls a multiplexer (MUX) 409 so the MUX 409 outputs an OFDM signal or EV-DO signal according to the transmission scheme, thereby selecting transmission of the OFDM signal or EV-DO signal.

When the MIMO is not supported for a non-MIMO interlace, the MIMO interlace selector 412 controls the operation of the MIMO pilot tone inserter 405 and the MIMO pilot inserter 410 to prevent the MIMO pilot tone or the MIMO pilot from being inserted into the pilot dedicated for the MIMO. The transmitter shown in FIG. 4 follows a typical OFDM transmission scheme or EV-DO transmission scheme. Therefore, in a system including both users of the OFDM or EV-DO transmission schemes using the MIMO or users of the OFDM or EV-DO transmission schemes not using the MIMO, it is preferable to fixedly locate an interlace for allocation of the MIMO pilot or a MIMO pilot tone for support of the MIMO.

Further, a controller 414 controls the operation of the MIMO interlace selector 412 by checking whether the MIMO interlace has been allocated, and controls the operation of the OFDM/EV-DO selector 413 by checking whether the current slot is for the transmission for the OFDM users or the EV-DO users.

Hereinafter, a process of transmission by a Base Station (BS) for the OFDM transmission scheme or MIMO-OFDM transmission scheme according to the present invention will be described.

Physical layer packet data generated in a higher layer is input to and encoded by the channel encoder 401, and the channel-encoded bit stream is interleaved by the channel interleaver 402 in order to obtain a diversity gain. The interleaved bit stream is input to and modulated into a modulation signal by the modulator 403. The modulation signal is located at the data tone of the data transmission period in the slot construction shown in FIG. 3.

Further, the guard tone inserter 404 places the guard tones at the band periphery of the signal output from the modulator 403. For a MIMO-OFDM transmission scheme, the MIMO interlace selector 412 of the transmitter inserts a MIMO pilot tone into an allocated interlace by controlling the operation of the MIMO pilot tone inserter 405. For a typical OFDM transmission scheme, the insertion of the MIMO pilot tone is omitted. When using a typical OFDM transmission scheme, the HRPD processor 415 inserts and transmits only the pilot signal of a typical EV-DO system.

When signals to be transmitted have been allocated to all tones according to the operation described above, the spreader 406 performs, for example, QPSK spreading, through which different complex Pseudo Noise (PN) streams of BS signals transmitting different information are multiplied by each other. The complex PN streams refer to a complex number stream in which both the real number components and the imaginary number components are PN codes. The modulation signals having been subjected to the QPSK spreading are IFFTed by the IFFT processor 407, so they are located at the positions of desired frequency tones. Further, the CP inserter 408 generates an OFDM symbol by inserting a CP into the IFFTed OFDM data in order to prevent self-interference due to the multi-path fading. The OFDM symbol having the MIMO pilot tone inserted therein is transferred through the MUX 409 to the HRPD processor 415 under the control of the OFDM/EV-DO selector 413.

Further, the HRPD processor 415 performs the compatibility processing of the HRPD system in order to multiplex the pilot signals 303 and 308 and the MAC signals 302, 304, 307, and 309 together with the transmission data by the TDM scheme according to the slot structure shown in FIG. 3. Therefore, the wireless signal finally transmitted through the transmitter shown in FIG. 4 has the slot structure as shown in FIG. 3.

Hereinafter, a process of transmission by a base station for a typical EV-DO transmission scheme or an EV-DO transmission scheme supporting the MIMO according to the present invention will be described.

When an EV-DO transmission scheme supporting the MIMO is used, the MIMO interlace selector 412 of the transmitter inserts a MIMO pilot into an allocated interlace by controlling the operation of the MIMO pilot tone inserter 405 having received a transmission signal from the EV-DO transmitter 411. The signal having the MIMO pilot inserted therein is transferred through the MUX 409 to the HRPD processor 415 under the control of the OFDM/EV-DO selector 413. Further, the HRPD processor 415 performs the compatibility processing of the HRPD system in order to multiplex the pilot signals 303 and 308 and the MAC signals 302, 304, 307, and 309 together with the transmission data by the TDM scheme according to the slot structure shown in FIG. 3. When a typical OFDM transmission scheme is used, the insertion of the MIMO pilot tone by the MIMO pilot tone inserter 405 is omitted. That is, when using a typical OFDM transmission scheme, the HRPD processor 415 inserts and transmits only the pilot signal of a typical EV-DO system.

Meanwhile, it is possible to construct a transmitter, which has a fixed interlace in which, for example, a MIMO pilot tone or a MIMO pilot is inserted, further to the transmitter structure shown in FIG. 4, and uses one of the MIMO OFDM scheme and MIMO EV-DO scheme as a transmission scheme dedicated for the MIMO.

Hereinafter, a scheme for arranging MIMO pilot tones and MIMO pilots in the case of using an EV-DO transmission scheme and an OFDM transmission scheme supporting the MIMO in an HRPD system according to the present invention will be described with reference to FIGS. 5A to 5C.

Figure 5A:
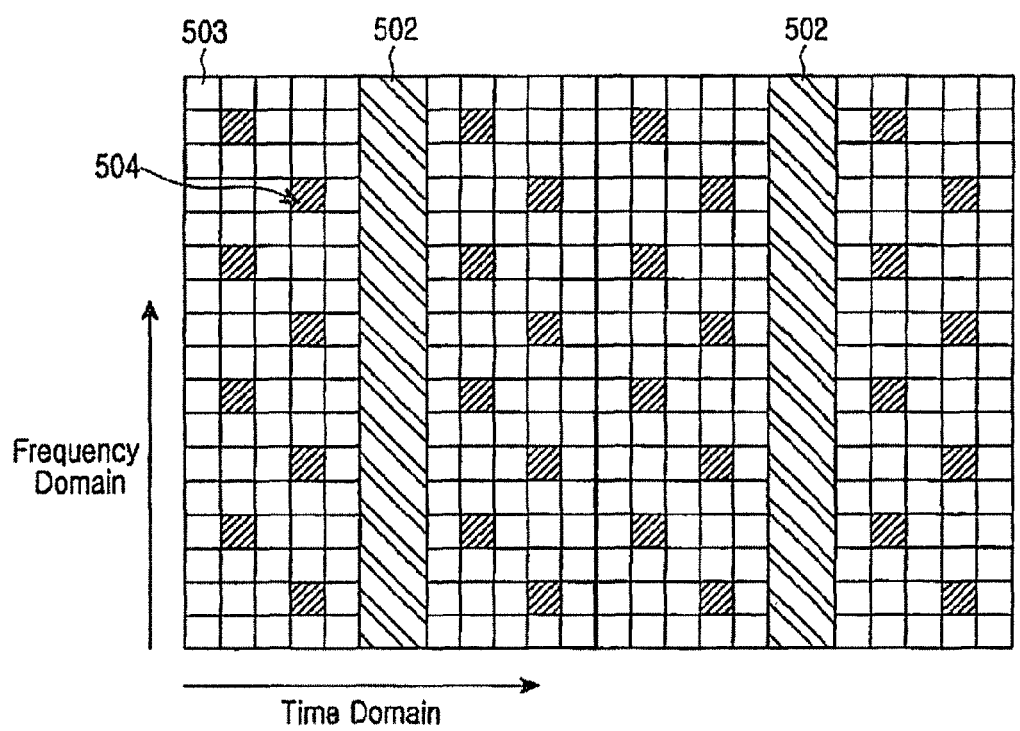
FIG. 5A illustrates an example of arrangement of MIMO pilot tones when using an OFDM transmission scheme supporting the MIMO in a forward link of an HRPD system according to the present invention.

FIG. 5A shows an example of arrangement of MIMO pilot tones when using an OFDM transmission scheme supporting the MIMO in a forward link of an HRPD system according to the present invention.

When using a typical EV-DO or OFDM transmission scheme, the pilot signals inserted by the HRPD processor 415 can be used as they are, as described above. However, when a Mobile Station (MS) supports the MIMO, since it is impossible to estimate the channel of a multi-antenna by the existing pilot signal 502, the present invention places a MIMO pilot tone 504 dedicated for the MIMO in the data transmission region in which is the data tone 503 is located. The MIMO pilot tone 504 can be used in various forms in the time domain and the frequency domain within one slot.

The arrangement shown in FIG. 5A is intended to improve the frequency diversity. However, it is possible to arrange the MIMO pilot tones 504 in various forms in the time domain and the frequency domain. The present invention may also be applied to arrangements where the pilot tones are exclusively arranged for the MIMO.

Figure 5B:
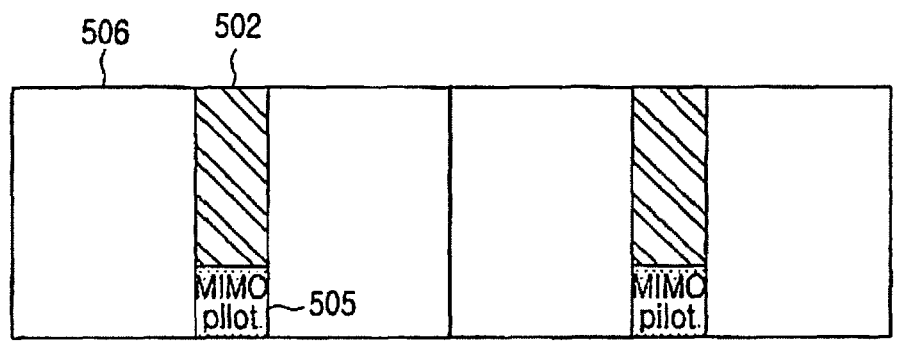
FIGS. 5B and 5C illustrate examples of arrangement of MIMO pilots when using the EV-DO transmission scheme supporting the MIMO in a forward link of an HRPD system according to the present invention.
Figure 5C:
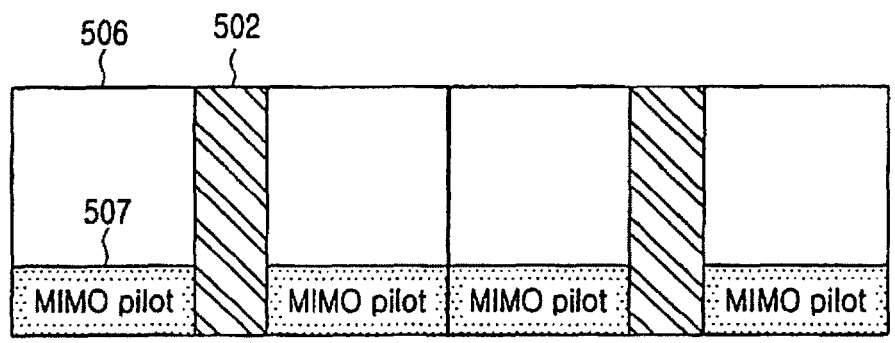

FIGS. 5B and 5C show examples of arrangement of MIMO pilots when using the EV-DO transmission scheme supporting the MIMO in a forward link of an HRPD system according to the present invention. FIG. 5B corresponds to an arrangement in which the MIMO pilots 505 are inserted in the existing pilot signal region 502 after being subjected to the Code Division Multiplexing (CDM), and FIG. 5C corresponds to an arrangement in which the MIMO pilots 507 are inserted in the existing pilot signal region 506 after being subjected to the CDM.

Figure 6A:
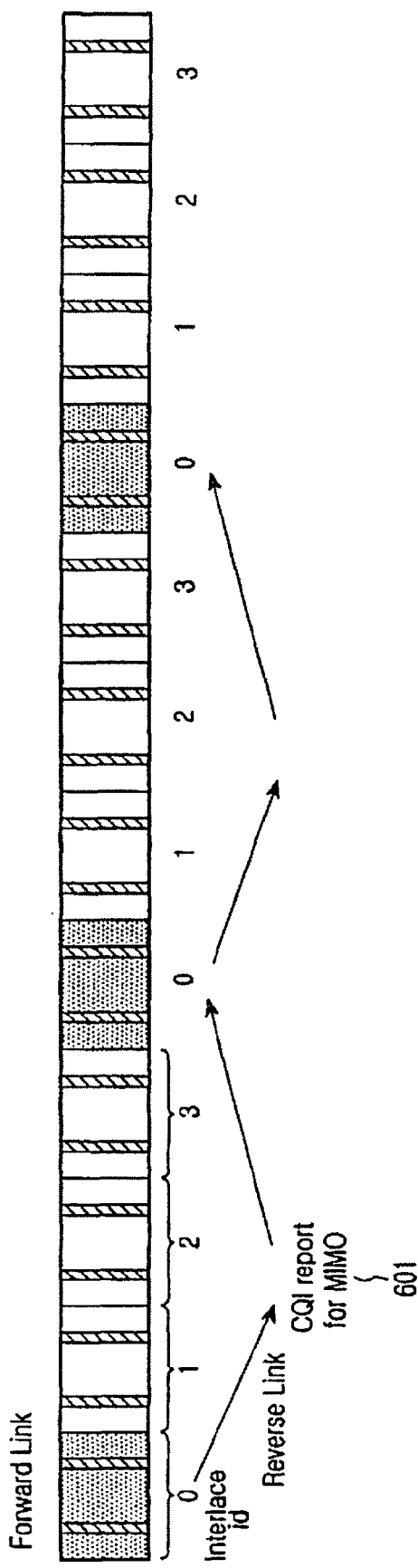
FIG. 6A is a view in order to illustrate the reason why interlaces for the MIMO users are fixedly allocated in the forward link of an HRPD system according to the present invention.

FIG. 6A shows a reason why interlaces for the MIMO users are fixedly allocated in the forward link of an HRPD system according to the present invention.

In the HRPD system according to the present invention in which an OFDM system and EV-DO system supporting the MIMO and a typical OFDM system and EV-DO system co-exist, it is possible to use feedback (Channel Quality Information (CQI)) information 601 for the multi-antenna, which is transmitted to a BS from an MS of a MIMO user, as shown in FIG. 6A. By receiving the feedback (CQI) information 601 from the MS, the transmitter of the BS can control the power of the MIMO pilot and the MIMO pilot tone in the next transmission.

When fixedly allocated interlaces are used for transmission of the MIMO pilots and the MIMO pilot tones, the BS can support the MIMO user in an easy and simple manner without using a complex higher control signal. That is, the BS can inform the MS of the interlace to be exclusively used for the MIMO through the control signal, and the BS transmits data of the MIMO user by using the dedicated fixed interlace. Further, the MS receives data through an interlace allocated to the MS itself by using the received control signal from the BS.

Figure 6B:
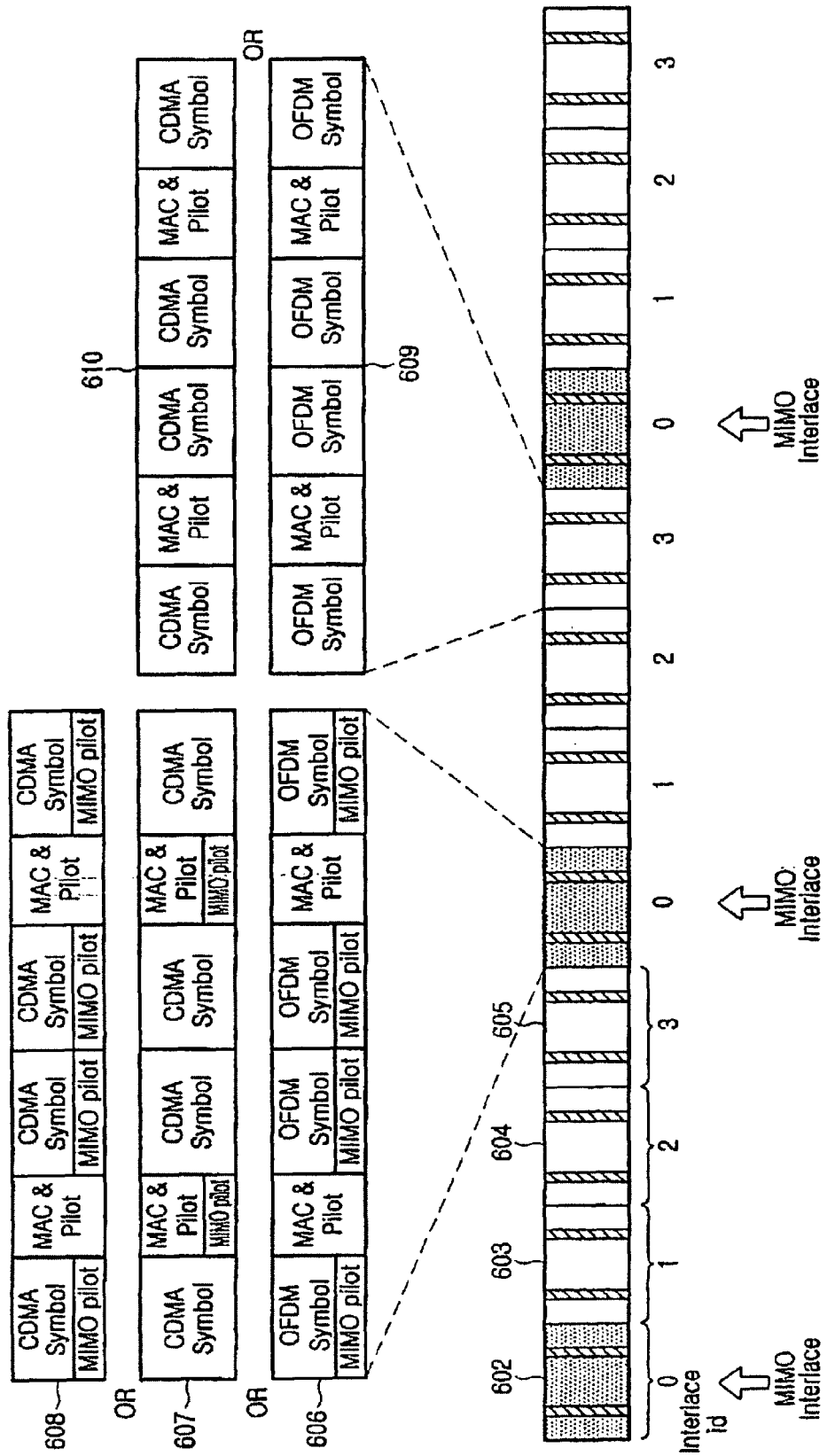
FIG. 6B illustrates an example in which interlaces are fixedly allocated exclusively for the MIMO in the forward link of an HRPD system according to the present invention.

FIG. 6B shows an example in which interlaces are fixedly allocated exclusively for the MIMO in the forward link of an HRPD system according to the present invention. Interlace #0 602 has been allocated exclusively for the MIMO, and the other interlaces #1, #2, and #3 603, 604, and 605 have been allocated for data transmission for typical OFDM users using the existing pilot signals transmitted by the TDM, for example, typical EV-DO rev. A/B users or typical OFDM users. Therefore, through interlace #0 602, it is possible to transmit data of the OFDM or EV-DO user supporting the MIMO.

In FIG. 6B, reference numerals 606 to 608 denote slot structures transmitted through interlace #0 602, in which the MIMO pilot tones or MIMO pilots are inserted according to the arrangements shown in FIGS. 5A to 5C, respectively. Further, in FIG. 6B, reference numerals 609 and 610 denote slot structures in which the pilot signals for a typical OFDM user and EV-DO user are transmitted by the TDM as in the existing structure, respectively.

Figure 2:
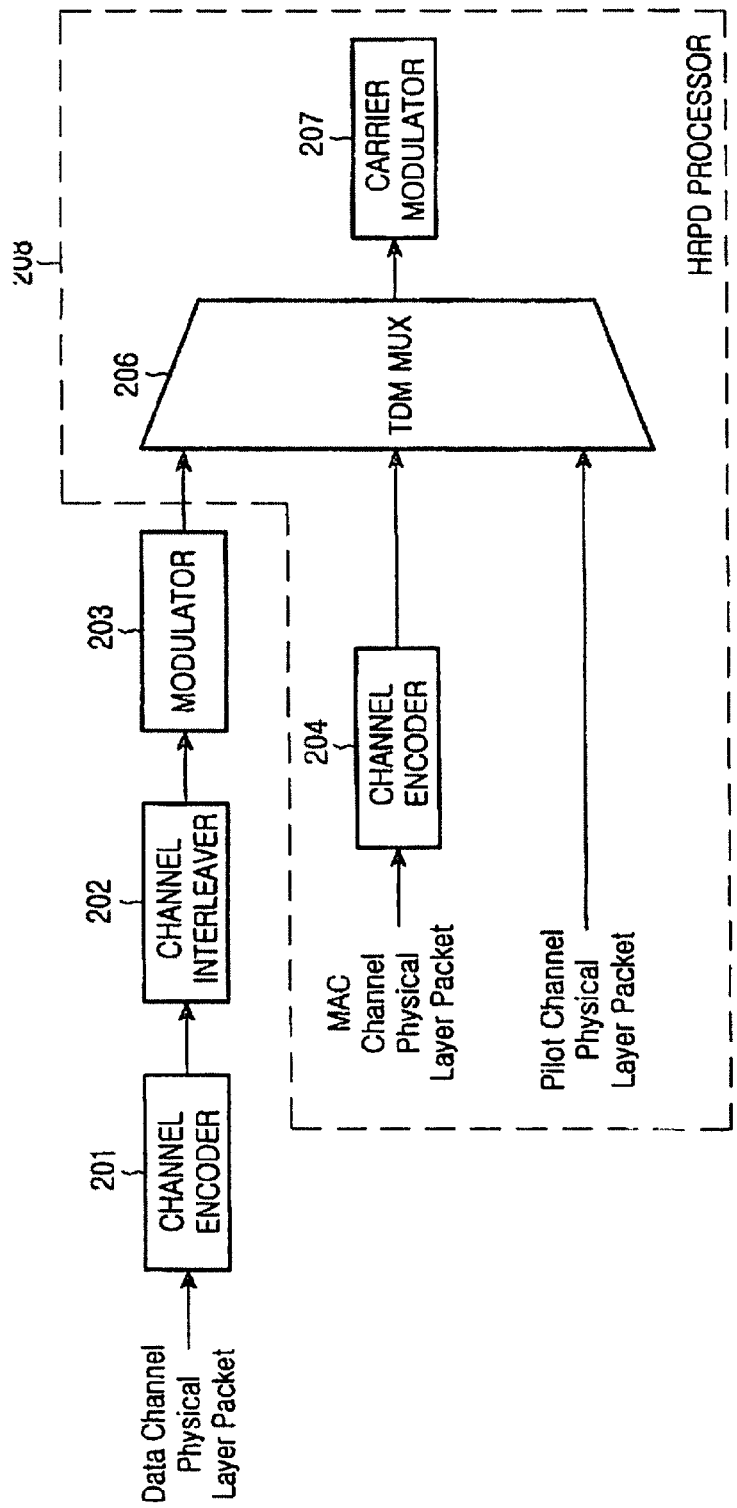
FIG. 2 illustrates a structure of a transmitter of a conventional HRPD system.
Figure 7:
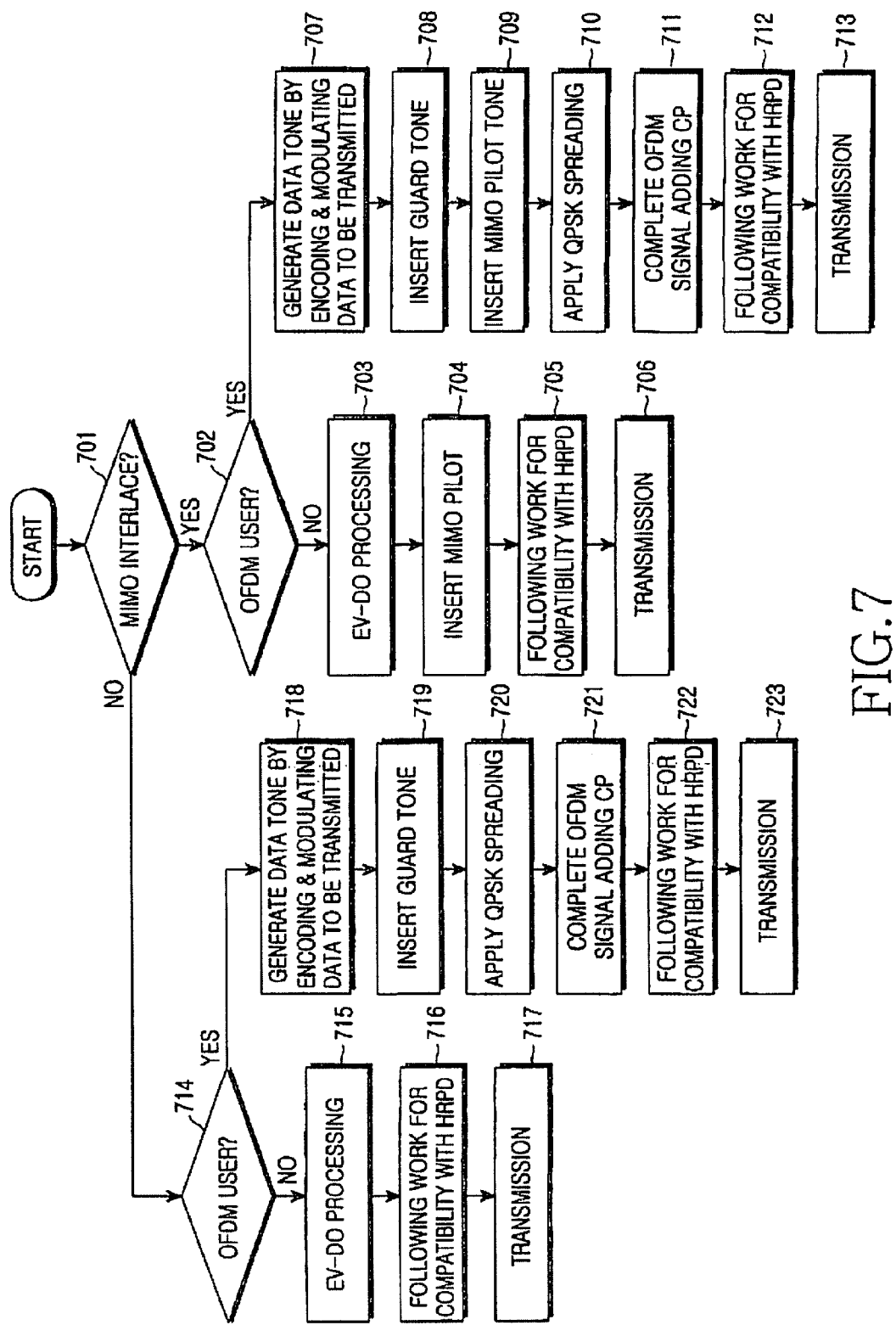
FIG. 7 is a flow diagram of a transmission process when MIMO interlaces have been allocated in the forward link of an HRPD system according to the present invention.

FIG. 7 shows a transmission process according to whether MIMO interlaces have been allocated in the forward link of an HRPD system according to the present invention. In step 710, the controller 414 of the transmitter determines whether the current slot to be transmitted is a MIMO interlace slot. When the current slot to be transmitted is a MIMO interlace slot, the controller 414 determines in step 702 whether the transmission is for a MIMO-OFDM user or a MIMO EV-DO user, in order to perform an operation according to a corresponding transmission scheme. When the transmission has been determined as transmission for the EV-DO user in step 702, the transmitter proceeds to step 703 in which the transmitter performs general EV-DO transmission. Then, in step 704, under the control of the controller 414, the MIMO interlace selector 412 operates the MIMO pilot inserter 410 in order to insert a MIMO pilot into a transmission signal. The MIMO interlace selector 412 may insert the MIMO pilot 505 in the existing pilot signal region 502 after code division multiplexing the pilot or may insert the MIMO pilot 507 in the existing data region 506 according to a CDM scheme. Thereafter, under the control of the OFDM/EV-DO selector 413, the MUX 409 outputs a signal in which the MIMO pilot has been inserted, and the HRPD processor 415 of the transmitter performs compatibility processing in order to TDM transmit a data channel, a MAC channel, and a pilot channel as designated by reference numeral 208 of FIG. 2 for the compatibility with the HRPD system in step 705, and then transmits the TDMed signal by a sub-carrier to a radio network in step 706.

Meanwhile, when it is determined in step 702 that the transmission is for the OFDM user, the transmitter proceeds to step 707 in which the transmitter encodes, interleaves, and modulates data to be transmitted, thereby generating a data tone. Thereafter, the guard tone inserter 404 of the transmitter inserts a guard tone into a portion near to a band periphery of the modulation signal in step 708, and the MIMO pilot tone inserter 405 inserts the MIMO pilot tone in the interlace allocated under the control of the MIMO interlace selector 412, for example, as shown in FIG. 5A. Then, when signals to be transmitted have been allocated to all tones, the spreader 406 performs, for example, QPSK spreading in step 710, so the modulation signals having been subjected to the spreading are placed at desired locations of desired frequency tones through IFFT by the IFFT processor 407. Then, in step 711, the CP inserter 408 inserts a CP into the IFFTed OFDM data in order to prevent the self-interference, thereby generating an OFDM symbol. Thereafter, under the control of the OFDM/EV-DO selector 413, the MUX 409 outputs an OFDM signal having a MIMO pilot tone inserted therein, and the HRPD processor 415 of the transmitter performs compatibility processing in order to TDM transmit a data channel, a MAC channel, and a pilot channel for the compatibility with the HRPD system in step 712, and then transmits the TDMed signal by a sub-carrier to a radio network in step 713.

Meanwhile, when it is determined in step 701 that the current slot to be transmitted is not a MIMO interlace slot, the transmitter of the BS determines in step 714 whether the transmission is for an OFDM user or an EV-DO user, in order to perform an operation according to a corresponding transmission scheme. The operation in steps 718 to 723 corresponding to a transmission process for a non-MIMO OFDM user is the same as the operation the operation in steps 707 to 713 except for the operation of MIMO pilot tone insertion in step 709 of FIG. 7, and the operation in steps 715 to 717 corresponding to a transmission process for a non-MIMO EV-DO user is the same as the operation in steps 715 to 717 except for the operation of MIMO pilot insertion in step 704 of FIG. 7, so detailed description will be omitted.

Hereinafter, a structure of a receiver according to the present invention will be described with reference to FIGS. 8 to 11 for each transmission scheme. The receivers shown in FIGS. 8 to 11 correspond to receivers using a non-MIMO EV-DO scheme, a MIMO EV-DO scheme, a non-MIMO OFDM scheme, and a MIMO OFDM scheme, respectively. When an actual MS is implemented, at least one of the four types of receivers can be implemented within the MS. Then, the MS can receive a forward signal through a corresponding receiver according to a transmission scheme indicated by a control signal of a BS or according to a transmission scheme promised in advance between the MS and the BS.

Figure 8:
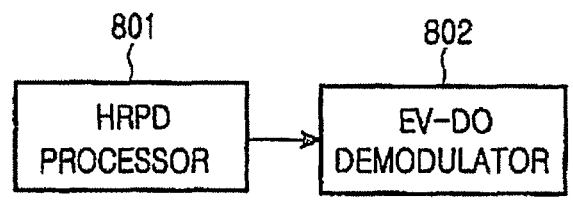
FIG. 8 is a block diagram illustrating a structure of a receiver when using a non-MIMO EV-DO transmission scheme in a forward link of an HRPD system according to the present invention.

FIG. 8 shows a receiver in the case of using a non-MIMO EV-DO transmission scheme in a forward link of an HRPD system according to the present invention. An HRPD processor 801 operates in a process inverse to the operation of the HRPD processor 415 of FIG. 4. Specifically, the HRPD processor 801 demultiplexes TDMed data channel, MAC channel, and pilot channel signals and then transfers the demultiplexed signals. An EV-DO demodulator 802 receives the data channel from among the demultiplexed signals from the HRPD processor 801 and demodulates the data according to, for example, an EV-DO rev. A/B scheme. The EV-DO demodulator 802 is well-known in the art, so a detailed description will be omitted.

Figure 9:
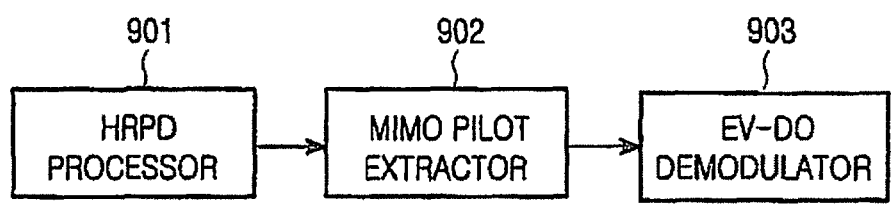
FIG. 9 is a block diagram illustrating a structure of a receiver when using a MIMO EV-DO transmission scheme in a forward link of an HRPD system according to the present invention.

FIG. 9 shows a receiver when using a MIMO EV-DO transmission scheme in a forward link of an HRPD system according to the present invention. An HRPD processor 901 operates in a process inverse to the operation of the HRPD processor 415 of FIG. 4. Specifically, the HRPD processor 901 demultiplexes TDMed data channel, MAC channel, and pilot channel signals and then transfers the demultiplexed signals. A MIMO pilot extractor 902 performs channel estimation by using a MIMO pilot inserted in the data channel region or pilot channel region from among the demultiplexed signals as shown in FIG. 5B or 5C and outputs a signal corresponding to the data. Further, the EV-DO demodulator 903 demodulates the received data according to, for example, an EV-DO rev. A/B scheme.

Figure 10:
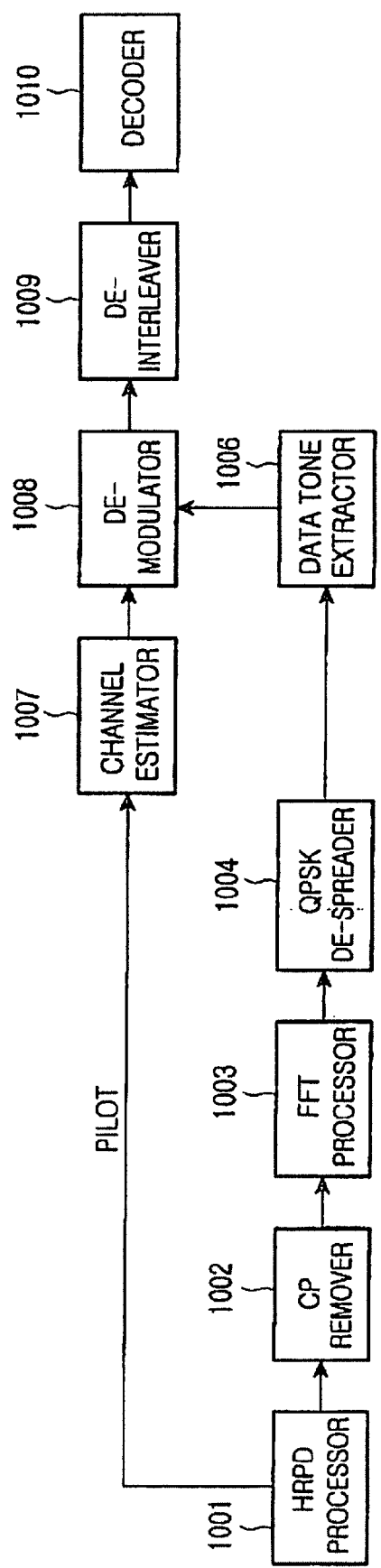
FIG. 10 is a block diagram illustrating a structure of a receiver when using a non-MIMO OFDM transmission scheme in a forward link of an HRPD system according to the present invention.

FIG. 10 shows a receiver when using a non-MIMO OFDM transmission scheme in a forward link of an HRPD system according to the present invention. An HRPD processor 1001 operates in a process inverse to the operation of the HRPD processor 415 of FIG. 4. Specifically, the HRPD processor 1001 demultiplexes TDMed data channel, MAC channel, and pilot channel signals and then transfers the demultiplexed signals. From among the transferred demultiplexed signals, a pilot signal is transferred to a channel estimator 1007 and a data signal is transferred to a CP remover 1002. The CP remover 1002 eliminates the CP contaminated due to the propagation delay, the multi-path, etc., from the received signal. An FFT processor 1003 converts the input time domain signal to a frequency domain signal, and a QPSK de-spreader 1004 de-spreads the frequency domain signal and outputs tones of each signal. This is based on an assumption that the signal transmitted by the transmitter is spread before being transmitted. Therefore, when the transmitter uses a different spreading scheme, the receiver is equipped with a de-spreader corresponding to the used spreading scheme.

The de-spread tones of each signal are transferred to the data tone extractor 1006, which extracts data tones from the received signal tones. Meanwhile, the channel estimator 1007 estimates the channel from the received pilot signal, and transfers the channel-estimation value to a demodulator 1008. The demodulator 1008 performs demodulation of the data tones by using the received channel estimation value, and the demodulated signal is de-interleaved by a de-interleaver 1009 and is then input to a decoder 1010. The decoder 1010 decodes the input signal, thereby restoring the originally transmitted signal.

Figure 11:
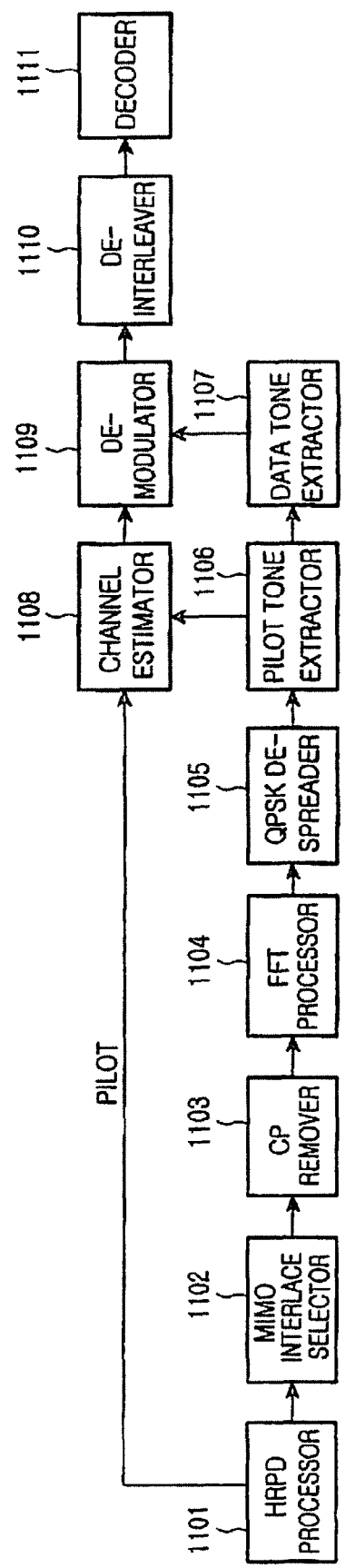
FIG. 11 is a block diagram illustrating a structure of a receiver when using a MIMO OFDM transmission scheme in a forward link of an HRPD system according to the present invention.

FIG. 11 shows a receiver in the case of using a MIMO OFDM transmission scheme in a forward link of an HRPD system according to the present invention. The same components of the receiver shown in FIG. 11 as those of the receiver shown in FIG. 10 have the same functions as those of latter, so detailed description will be omitted.

In the receiver of FIG. 11, an HRPD processor 1101 operates in a process inverse to the operation of the HRPD processor 415 of FIG. 4. Specifically, the HRPD processor 1101 demultiplexes TDMed data channel, MAC channel, and pilot channel signals and then transfers the demultiplexed signals. From among the transferred demultiplexed signals, a pilot signal is transferred to a channel estimator 1108 and a data signal is transferred to a MIMO interlace selector 1102. The MIMO interlace selector 1102 determines whether the received signal corresponds to a fixedly allocated interlace, and then transfers the received signal to a CP remover 1103. Then, the CP remover 1103 eliminates the CP contaminated due to the propagation delay, the multi-path, etc. from the received signal. An FFT processor 1104 converts the input time domain signal to a frequency domain signal, and a QPSK de-spreader 1105 QPSK de-spreads the frequency domain signal and outputs tones of each signal. This is based on an assumption that the signal transmitted by the transmitter is QPSK spread before being transmitted. Therefore, when the transmitter uses a different spreading scheme, the receiver is equipped with a de-spreader corresponding to the used spreading scheme.

The receiver of FIG. 11 is equipped with a MIMO pilot extractor 1106 for channel estimation, and the de-spread tones of each signal are transferred to the MIMO pilot extractor 1106. The MIMO pilot extractor 1106 extracts a MIMO pilot tone inserted in a data channel region as shown in FIG. 5A from the interlace allocated exclusively for the MIMO-OFDM and transmits the extracted MIMO pilot tone to the channel estimator 1108. 1107k extracts data tones except for the MIMO pilot tone from the data region and transfers the extracted data tones to a demodulator 1109 for restoration of the originally transmitted signal.

As described above, the present invention uses an HRPD system and a transmission technology based on an EV-DO scheme and an OFDM scheme while maintaining compatibility between them and transmits a MIMO-only pilot/pilot tone by a fixedly allocated MIMO interlace. Therefore, according to the present invention, it is possible to effectively use the MIMO in a system in which EV-DO users, MIMO EV-DO users, OFDM users, MIMO-OFDM users co-exist.

While the invention has been shown and described with reference to certain embodiments thereof, it will be understood by those skilled in the art that various changes in form and details may be made therein without departing from the spirit and scope of the invention as defined by the appended claims. For example, the arrangement of the MIMO pilot tones or MIMO pilots shown in FIG. 5A to 5C is only an example, and the present invention is applicable various types of different arrangements. Further, in allocation of the interlaces, the identifications and the number of fixedly allocated interlaces may become different according to the number of MIMO-OFDM users within a base station. Therefore, the scope of the present invention should not be limited to the described embodiments and should be determined by the attached claims and equivalents thereof.

What is claimed is:

1. A method for transmitting data by a transmitter with a plurality of antennas in a communication system with a plurality of antennas, the method comprising the steps of:
    transmitting, to a receiver, information defining a transmission time interval for a data transmission that is based on a first type reference signal; and
    transmitting, to the receiver, the first type reference signal and data based on the first type reference signal in the transmission time interval predefined between the transmitter and the receiver by the information,
    wherein the transmission time interval is disposed at a fixed position within a period that includes a plurality of transmission time intervals.

2. The method of claim 1, further comprising transmitting data based on a second type reference signal in the transmission time interval,
    wherein the second type reference signal is transmitted at a predetermined position in a time domain and a predetermined position in a frequency domain.

3. The method of claim 2, wherein the first type reference signal is time division multiplexed with the second type reference signal in the transmission time interval.

4. The method of claim 2, wherein the predetermined position in the time domain is located on a first Orthogonal Frequency Division Multiplexing (OFDM) symbol or a last OFDM symbol in the transmission time interval.

5. The method of claim 1, wherein the first type reference signal is transmitted at a position in a frequency domain that corresponds to a position of the data in the frequency domain and at a position in a time domain that is in the transmission time interval.

6. The method of claim 1, wherein the transmission time interval comprises two parts, and each of the two parts includes the first type reference signal disposed in a center thereof.

7. The method of claim 6, wherein each of the two parts further includes control information that is located on at least one side of the first type reference signal.

8. A transmitter for transmitting data in a communication system with a plurality of antennas, the transmitter comprising:
    a transmission unit implemented in a processor configured to transmit, to a receiver, information defining a transmission time interval for a data transmission that is based on a first type reference signal and to transmit, to the receiver, the first type reference signal and data based on the first type reference signal in the transmission time interval predefined between the transmitter and the receiver by the information,
    wherein the transmission time interval is disposed at a fixed position within a period that includes a plurality of transmission time intervals.

9. The transmitter of claim 8, wherein the transmission unit is further configured to transmit data based on a second type reference signal in the transmission time interval, and
    wherein the second type reference signal is transmitted at a predetermined position in a time domain and a predetermined position in a frequency domain.

10. The transmitter of claim 9, wherein the first type reference signal is time division multiplexed with the second type reference signal in the transmission time interval.

11. The transmitter of claim 9, wherein the predetermined position in the time domain is located on a first Orthogonal Frequency Division Multiplexing (OFDM) symbol or a last OFDM symbol in the transmission time interval.

12. The transmitter of claim 8, wherein the first type reference signal is transmitted at a position in a frequency domain that corresponds to a position of the data in the frequency domain and at a position in a time domain that is in the transmission time interval.

13. The transmitter of claim 8, wherein the transmission time interval comprises two parts, and each of the two parts includes the first type reference signal disposed in a center thereof.

14. The transmitter of claim 13, wherein each of the two parts further includes control information being located on at least one side of the first type reference signal.

15. A method for receiving data by a receiver with a plurality of antennas in a communication system, the method comprising the steps of:
    receiving, from a transmitter, information defining a transmission time interval for a data transmission that is based on a first type reference signal; and
    receiving, from the transmitter, the first type reference signal and data based on the first type reference signal in the transmission time interval predefined between the transmitter and the receiver by the information, wherein the transmission time interval is disposed at a fixed position within a period that includes a plurality of transmission time intervals.

16. The method of claim 15, further comprising receiving data based on a second type reference signal in the transmission time interval, wherein the second type reference signal is transmitted at a predetermined position in a time domain and a predetermined position in a frequency domain.

17. A receiver for receiving data in a communication system with a plurality of antennas, the receiver comprising:

a receiving unit implemented in a processor configured to receive, from a transmitter, information defining a transmission time interval for a data transmission that is based on a first type reference signal and to receive, from the transmitter, the first type reference signal and data based on the first type reference signal in the transmission time interval predefined between the transmitter and the receiver by the information, wherein the transmission time interval is disposed at a fixed position within a period that includes a plurality of transmission time intervals.

18. The receiver of claim 17, wherein the receiving unit is further configured to receive data based on a second type reference signal in the transmission time interval, and wherein the second type reference signal is transmitted at a predetermined position in a time domain and a predetermined position in a frequency domain.

* * * * *